March 10, 1936.  A. P. BALL  2,033,874
VENTILATING WINDOW MECHANISM
Filed July 30, 1934
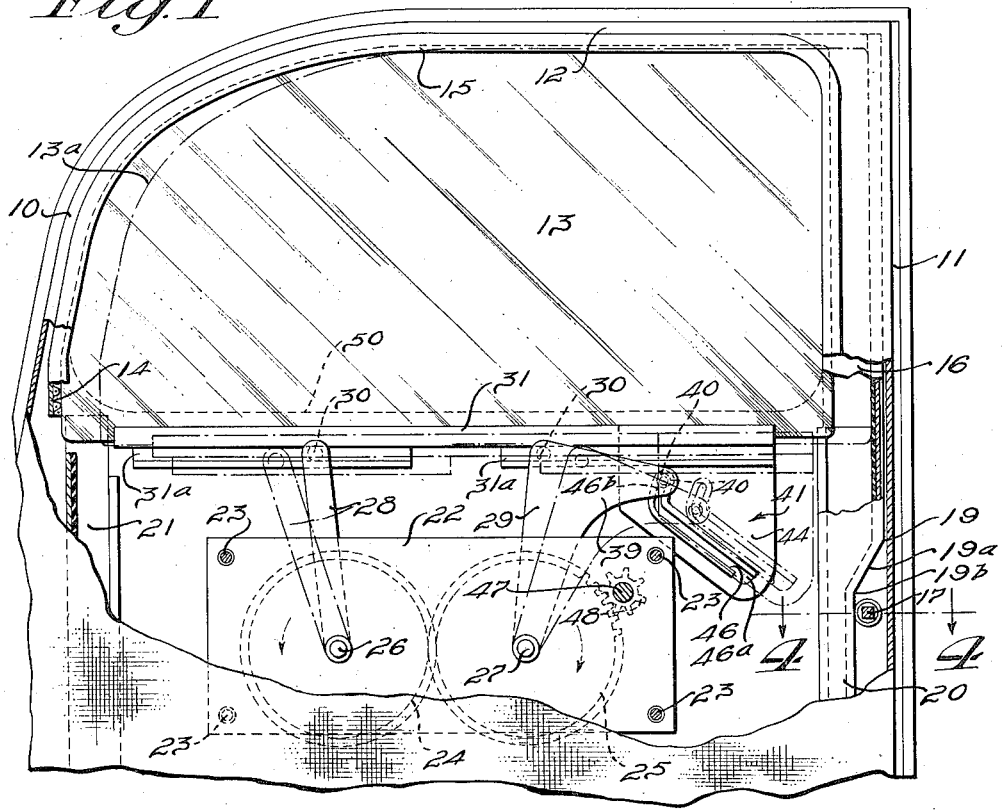
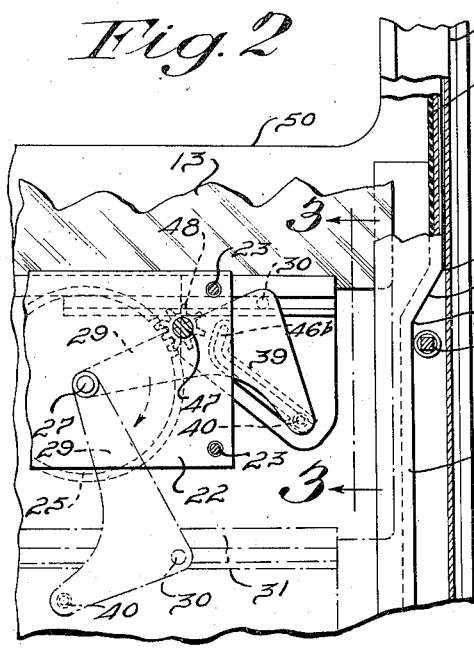
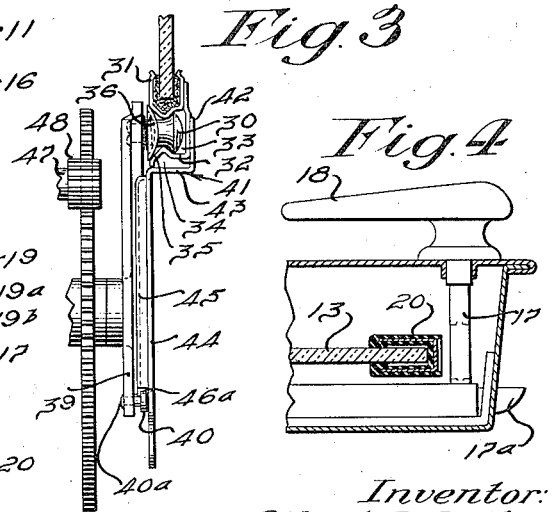
Inventor:
Albert P. Ball
By Dike, Calver & Gray
Attorneys.

Patented Mar. 10, 1936

2,033,874

UNITED STATES PATENT OFFICE 2,033,874

VENTILATING WINDOW MECHANISM

Albert P. Ball, Detroit, Mich., assignor to Automobile Ventilation, Inc., Detroit, Mich., a corporation of Michigan Application July 30, 1934, Serial No. 737,524

11 Claims. (Cl. 268—126)

This invention relates to ventilating windows for vehicle bodies and more particularly to window ventilation in doors of automobile bodies. An object of the invention is to provide an improved and relatively simple and economical mechanism for raising and lowering the window glass in the body or door and for providing a ventilating slot at the forward edge of the glass when the glass is fully raised, and also for sliding the glass in its plane into and out of position to close said ventilating slot.

In accordance with the present preferred embodiment of the invention it is desirable to raise the glass vertically into ventilating position in the window opening and thence shift it forwardly into fully closed position. Such a construction has the important advantage of ensuring the tight closing of the window when the regulator has been operated to the limit of its travel in one direction, thus preventing the danger of accidentally leaving the window partly open at its top as a consequence of the regulator mechanism overrunning in the use of structures in which the glass is first elevated into fully closed position and then shifted rearwardly to ventilating position.

Where it is desirable to use the present structure, in which the window is first shifted vertically into ventilating position, in a vehicle door hinged at its forward edge, difficulty has been experienced in causing the rear edge of the glass to pass the lock mechanism during its vertical travel except where an undesirably wide rear door pillar is provided.

The foregoing disadvantages are overcome by virtue of the present invention whereby means is provided for shifting or displacing the glass longitudinally during its vertical travel so as to pass or clear any latch obstruction, thus permitting a deep channel or glass runway to be used at the upper rear edge of the glass without, however, necessitating any increase in the width or thickness of the rear door pillar.

Other objects of this invention will appear in the following description and appended claims, reference being had to the accompanying drawing forming a part of this specification wherein like reference characters designate corresponding parts in the several views.

In said drawing:

Fig. 1 is a fragmentary side elevation illustrating a front door of an automobile body embodying the present invention.

Fig. 2 is an enlarged fragmentary view, partly in section, illustrating a predetermined position of the operating mechanism.

Fig. 3 is a detail section taken substantially along the lines 3—3 of Fig. 2, in the direction of the arrows; and Fig. 4 is a detail horizontal sectional view taken substantially along the lines 4—4 of Fig. 1, looking in the direction of the arrows.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phaseology or terminology employed herein is for the purpose of description and not of limitation, and it is not intended to limit the invention claimed herein beyond the requirements of the prior art.

In the drawing there is illustrated, by way of example, a front door of an automobile having a window glass mounted therein and adapted to be elevated by regulator mechanism into position within the window opening of the door to provide a ventilating slot between the forward edge of the glass and the adjacent door pillar. The regulator mechanism is thus operative to move the window glass into its top vertical position while maintaining it at the same time in ventilating position, and this mechanism is also operative to shift the glass forwardly in its plane to close the ventilating slot and thus fully close the window opening. In the illustrated construction the door is hinged at its forward edge and is, therefore, provided with latch mechanism mounted in the rear pillar of the door. In order to permit the window glass to be moved vertically and upwardly into ventilating position and at the same time to prevent interference with the latch mechanism the present invention provides means for shifting the window glass horizontally in its plane at an intermediate point between its upper and lower positions so as to clear or avoid the latch mechanism and thus enable the rear edge of the window to overlie the latch mechanism when the glass is in its top ventilating position.

As shown in the drawing, the door comprises a front pillar 10 and a rear pillar 11 connected at their upper ends by the usual header 12. The front and rear pillars together with the header define a window opening which is adapted to be closed by a glass panel 13. Mounted in the front pillar 10 is a felted glass channel 14 adapted to receive the forward edge of the glass when fully closed, as shown in full lines, Fig. 1. The broken line 13a designates the forward edge of the glass when in one of its ventilating positions. The channel 14 extends upwardly and rearwardly at 15 within the header 12 so as to confine the upper edge of the glass when closed. The rear pillar 11 is constructed so as to provide a relatively deep glass channel or runway 16 to receive the rear edge of the glass when the latter is in ventilating position, as shown by the broken line 13a. The glass channel 16 is of sufficient depth to confine the rear edge of the glass when it is shifted forwardly to close the ventilating slot.

In the present instance the front pillar 10 of the door is hinged to the front body pillar (not shown) so that the door is latched, when closed, at its rear edge. The latch or lock mechanism for the door, as shown, comprises a transverse rotatable shaft 17 extending through the pillar 11 (see Fig. 4) this shaft being turned by means of a handle 18 to retract the latch bolt 17a. In the present embodiment the shaft 17 of the latch mechanism underlies the glass channel 16 and as a result it is not possible to shift the glass in a straight vertical line into and out of closed position. The deep glass runway or channel 16 terminates at a point 19 above the shaft 17 and then narrows and slopes inwardly and downwardly at an angle, as shown at 19a to the point 19b located inwardly of and adjacent the shank 17. Thence the runway or channel extends downward in a vertical direction within the door pillar 11, inwardly or forwardly of said shaft and provides a relatively shallow channel extension 20. The front pillar 10 is provided with an auxiliary glass runway or felted channel 21 located below the window sill 50 and effective, together with the shallow channel 20, to guide the window glass during the lower part of its travel.

The window regulator mechanism for raising and lowering the glass 13 may be of any suitable construction and in the present instance comprises, preferably, a mounting plate 22 secured by screws 23 or in any other suitable manner to the inside of the door well. The plate 22 carries a pair of intermeshing gears 24 and 25 which are journaled on the plate by means of pivots 26 and 27, respectively. Secured to the pivot 26 is a swinging arm 28 and secured to the pivot 27 is a swinging arm 29, these arms being adapted to be swung in opposite directions upon rotation of the gears. Secured to the outer end of each of the arms 28 and 29 is a stud or button-like device 30 having a shank which is preferably riveted to the end of the arm. Along the lower edge of the glass 13 there is fastened a felted channel 31. A plate or plates 31a are preferably spot welded to one face of the channel 31 and have depending walls forwardly flanged at 32 along their lower edges to provide with the lower end of the channel 31, a runway or runways 33 for the studs 30. Each runway, as shown at 34 in Fig. 3, has a constricted neck forming upper and lower tapered faces engaging the tapered sides of the stud 30, and the members 31 and 32 which together form the glass retaining member, have outwardly flared bearing surfaces 35 which are engaged by conical spring pressed washers 36. When the arms 28 and 29 are swung relatively to each other the studs 30 will slide or travel horizontally in the runways or camways 33 and thus raise or lower the window glass.

In the present instance the arm 29 has an integral upper extension 39 to the outer end of which is secured, in any desirable manner, a roller or button 40 which, as shown, has its shank riveted at 40a to the arm extension.

The horizontal glass channel 31 is provided with a depending bracket or cam plate, shown as a whole at 41, the upper vertical portion 42 thereof being secured to one face of the glass channel by spot welding, or in any other suitable manner. The bracket has a horizontal offset portion 43 and a depending substantially vertically extending portion 44. The bracket portion 44 is preferably embossed at 45 to provide a cam slot 46, open at its lower end as shown at 46a, and having a curved offset upper extension or portion 46b.

The operation of the mechanism is as follows:

When the window glass is in its fully closed position, the operation arms 28 and 29 are located in their full line positions, as seen in Fig. 1. When it is desired to lower the window, an operating handle (not shown) having a shaft 47 and a pinion 48 which meshes with the gear 25, is turned in a counter clockwise direction, thus rotating the gears 24 and 25 in opposite directions and swinging the arms 28 and 29 outwardly in opposite directions. During this rotation of the gears, the studs 30 slide or travel in the guideways 31a to lower the glass, while at the same time, the roller or button 40 moves downwardly in the cam slot extension 46b and rides against the right side of the cam slot to shift the glass to the right until its forward edge is in ventilating position away from the channel 14 as shown by the broken line 13a. When the glass is in this position the roller 40 is at the junction of the offset extension 46b and the main portion of the cam slot 40. On further travel in a downward direction, the roller rides against the left side of the main portion of the cam slot 46 and shifts the glass 13 gradually to the left so as to clear the latch shaft 17, the glass travelling in a path corresponding to the slope or inclination of the portion 19a of the glass channel. When the lower edge of the glass reaches the point 19b, the roller 40 rides out of the open lower end 46a of the cam slot. When the roller is free of the cam slot, further rotation of the crank handle and gears causes the glass to travel further downward in a vertical path until it reaches the lower limit of its movement. It will be understood that during the foregoing movement and shifting of the glass, the studs 30 are travelling in the runways 33 and that the outward and downward movement of the arms 28 and 29 about their pivots has caused the glass to travel downward to its lower limit.

When the glass is being moved to its upper or closed position, the reverse of the foregoing operation takes place. The glass first travels upwardly in a vertical path until the roller 40 enters the open end 40a of the cam slot, this occurring when the lower edge of the glass is at substantially the point 19b. On further rotation of the crank and gears, the roller 40 rides along the right side of the cam slot portion 46 and shifts the glass in its plane gradually to the right until said roller reaches the junction of the slot 46 and the offset slot extension 46b, whereupon the roller will ride against the left side of the cam slot extension 46b and shift the glass horizontally to the left into its fully closed position.

Thus, it will be seen that the glass is shifted longitudinally in its plane during its upward and downward travel. The glass moves upward in ventilating position until its upper edge engages the channel 15 or until the roller 40 enters the offset slot extension 46b. The glass also moves downward in ventilating position during the time the roller 40 is travelling in the main portion 46 of the cam slot.

From the foregoing it will be seen that the construction comprises a relatively simple and inexpensive cam and cam slot carried directly by the window glass and cooperating with one of the arms of the regulator mechanism to effect the desired up and down and longitudinal movements of the window glass in its plane.

It will be understood that the window glass may be mounted in the window frame of the door or body of any conventional automobile or power propelled vehicle. The glass is mounted to be raised and lowered, and it is understood that the terms "vertical" or "vertically" as used in the appended claims in respect to the movement of the glass are to be construed as defining the general upward and downward direction of movement of the glass.

It is to be understood also that the terms "longitudinal" and "longitudinally", used in the appended claims with respect to the movement of the glass, are to be construed as defining the general edgewise movement thereof in opposite directions lengthwise of the vehicle, as distinguished from the upward and downward direction of movement of the glass. Said longitudinal movement may also include a vertical component.

I claim:

1. In a vehicle body having a window opening and a window glass mounted therein for successive vertical and longitudinal movements in its plane, a window glass channel secured to the lower edge of said glass, a regulator mechanism including a pair of swinging arms connected to said window glass channel for raising and lowering the glass, a slotted cam on said window channel, and means carried by one of said arms and cooperating with said slotted cam for shifting the glass longitudinally during its raising and lowering movements.

2. In a vehicle body having a window opening and a window glass mounted therein for successive vertical and longitudinal movements in its plane, a window glass channel secured to the lower edge of said glass, a regulator mechanism including a pair of swinging arms connected to said window glass channel for raising and lowering the glass, a slotted cam on said window channel, and means carried by one of said arms and cooperating with said slotted cam for shifting the glass longitudinally during its raising and lowering movements and also for shifting the glass in its plane when elevated into and out of position to provide a ventilating slot at one upright edge thereof.

3. In a vehicle body having a window opening and glass runways for guiding a window glass vertically in said opening, a window glass channel secured to the lower edge of said glass, regulator mechanism connected to the glass channel for raising the glass into position in said opening to provide a ventilating slot between one upright edge of the glass and the adjacent runway, a bracket carried by said glass channel and having a cam slot formed therein, and means carried by said regulator mechanism and adapted to travel in said cam slot for shifting the glass longitudinally while elevated to close said ventilating slot and for shifting the glass in its plane toward and from said last named runway during the vertical travel of the glass.

4. In a vehicle body having a window opening and a window glass mounted therein for successive vertical and longitudinal movements in its plane, window regulator mechanism adapted to be connected to the lower edge of the window glass for raising and lowering the same, and a cam fixed to the lower edge of the window glass and cooperable with said window regulator mechanism for shifting the glass longitudinally in its plane during the vertical movement thereof.

5. In a vehicle body having a window opening and a window glass mounted therein for successive vertical and longitudinal movements in its plane, window regulator mechanism adapted to be connected to the lower edge of the window glass for raising and lowering the same, a cam fixed to the lower edge of the window glass, and a separate means carried by said regulator mechanism and cooperable with said cam for shifting the glass longitudinally in its plane during the vertical movement thereof.

6. In a vehicle body having a window opening and a window glass mounted therein for successive vertical and longitudinal movements in its plane, window regulator mechanism including a swinging arm having a connection with the lower edge of the window glass for raising and lowering the same, and a cam fixed to the lower edge of the window glass and cooperable with said arm for shifting the glass longitudinally in its plane during the vertical movement thereof.

7. In a vehicle body having a window opening and a window glass mounted therein for successive vertical and longitudinal movements in its plane, window regulator mechanism including a swinging arm having a connection with the lower edge of the window glass for raising and lowering the same, a cam fixed to the lower edge of the window glass, and an extension on said arm having a projection cooperating with said cam for shifting the glass longitudinally in its plane during the vertical movement thereof.

8. In a vehicle body having a window opening and a window glass mounted therein for successive vertical and longitudinal movements in its plane, window regulator mechanism adapted to be connected to the lower edge of the window glass for raising and lowering the same, and a cam fixed to the lower edge of the window glass and cooperable with said window regulator mechanism for shifting the glass forwardly in its plane during the downward movement thereof and rearwardly in its plane during its upward movement.

9. In a vehicle body having a window opening and a window glass mounted therein for successive vertical and longitudinal movements in its plane, a window glass channel secured to the lower edge of said glass, a regulator mechanism including a pair of swinging arms connected to said window glass channel for raising and lowering the glass, a slotted cam on said window channel, and means carried by one of said arms and cooperating with said slotted cam for shifting the glass forwardly in its plane during the downward movement thereof and rearwardly in its plane during its upward movement.

10. In a vehicle body having a window opening and a window glass mounted therein for successive vertical and longitudinal movements in its plane, window regulator mechanism adapted to be connected to the lower edge of the window glass for raising and lowering the same, a cam fixed to the lower edge of the window glass, and a separate means carried by said regulator mechanism and cooperable with said cam for shifting the glass forwardly in its plane during the downward movement thereof and rearwardly in its plane during its upward movement.

11. Regulator mechanism for a window glass mounted in a window opening of a vehicle body or the like in which the glass is capable of successive vertical and longitudinal movements in its plane, comprising means adapted to be connected to the lower edge of the glass for raising and lowering the same, and a cam fixed to the lower edge of the glass and cooperable with said means for displacing the glass longitudinally during its movement intermediate its upper and lower limits of travel.

ALBERT P. BALL.